United States Patent
Xu et al.

(10) Patent No.: US 10,366,006 B2
(45) Date of Patent: Jul. 30, 2019

(54) COMPUTING APPARATUS, NODE DEVICE, AND SERVER

(71) Applicant: Huawei Technologies Co., Ltd., Shenzhen (CN)

(72) Inventors: Jianrong Xu, Hangzhou (CN); Wei Zheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/954,002

(22) Filed: Apr. 16, 2018

(65) Prior Publication Data

US 2018/0232309 A1 Aug. 16, 2018

Related U.S. Application Data

(63) Continuation of application No. PCT/CN2016/095536, filed on Aug. 16, 2016.

(30) Foreign Application Priority Data

Oct. 15, 2015 (CN) .......................... 2015 1 0672294

(51) Int. Cl.
*G06F 12/10* (2016.01)
*G06F 12/0815* (2016.01)
(Continued)

(52) U.S. Cl.
CPC ...... *G06F 12/0815* (2013.01); *G06F 12/0817* (2013.01); *G06F 12/0833* (2013.01);
(Continued)

(58) Field of Classification Search
USPC ....................................... 711/141
See application file for complete search history.

(56) References Cited

U.S. PATENT DOCUMENTS 6,789,173 B1 9/2004 Tanaka et al.
2005/0053057 A1 3/2005 Deneroff et al.
(Continued)

FOREIGN PATENT DOCUMENTS

CN 1786936 A 6/2006
CN 101008921 A 8/2007
(Continued)

OTHER PUBLICATIONS

Machine Translation and Abstract of Chinese Publication No. CN103237046, Aug. 7, 2013, 14 pages.
(Continued)

*Primary Examiner* — Jae U Yu
(74) *Attorney, Agent, or Firm* — Conley Rose, P.C.

(57) ABSTRACT

A computing apparatus, including at least one general computing core circuit, an internal interface circuit, an external interface circuit, a cache coherence engine circuit, and a protocol conversion circuit. The computing apparatus is coupled to an internal apparatus using the internal interface circuit, and is coupled to an external apparatus using the external interface circuit. When working in a first mode, the cache coherence engine circuit implements cache coherence between the computing apparatus, the internal apparatus, and the external apparatus, and in this case, the computing apparatus is used as a node controller. When working in a second mode, the cache coherence engine circuit processes only cache coherence between the computing apparatus and the internal apparatus, and the external interface circuit is used as a network interface circuit.

20 Claims, 7 Drawing Sheets

(51) Int. Cl.
*G06F 13/16* (2006.01)
*H04L 12/40* (2006.01)
*G06F 12/0817* (2016.01)
*G06F 12/0831* (2016.01)

(52) U.S. Cl.
CPC .... *G06F 13/1668* (2013.01); *H04L 12/40123* (2013.01); *G06F 2212/1004* (2013.01); *G06F 2212/1032* (2013.01); *G06F 2212/154* (2013.01); *G06F 2212/502* (2013.01)

(56) References Cited

U.S. PATENT DOCUMENTS

| | | | |
|---|---|---|---|
| 2006/0259743 | A1 | 11/2006 | Suzuoki |
| 2007/0121659 | A1* | 5/2007 | Pong .................. G06F 13/4247 370/403 |
| 2011/0016201 | A1 | 1/2011 | Ishiki et al. |
| 2015/0095008 | A1 | 4/2015 | Wang et al. |

FOREIGN PATENT DOCUMENTS

| | | | |
|---|---|---|---|
| CN | 101091147 | A | 12/2007 |
| CN | 101859281 | A | 10/2010 |
| CN | 102880537 | A | 1/2013 |
| CN | 103237046 | A | 8/2013 |
| CN | 103150264 | B | 9/2014 |
| CN | 104199740 | A | 12/2014 |
| EP | 2869194 | A1 | 5/2015 |

OTHER PUBLICATIONS

Machine Translation and Abstract of Chinese Publication No. CN104199740, Dec. 10, 2014, 15 pages.
Foreign Communication From a Counterpart Application, PCT Application No. PCT/CN2016/095536, English Translation of International Search Report dated Nov. 2, 2016, 2 pages.
Foreign Communication From a Counterpart Application, PCT Application No. PCT/CN2016/095536, English Translation of Written Opinion dated Nov. 2, 2016, 6 pages.
Machine Translation and Abstract of Chinese Publication No. CN101008921, Aug. 1, 2007, 8 pages.
Machine Translation and Abstract of Chinese Publication No. CN101859281, Oct. 13, 2010, 11 pages.
Foreign Communication From a Counterpart Application, Chinese Application No. 201510672294.7, Chinese Office Action dated Feb. 3, 2019, 6 pages.
Machine Translation and Abstract of Chinese Publication No. CN102880537, Jan. 16, 2013, 6 pages.
Foreign Communication From a Counterpart Application, European Application No. 16854829.5, Extended European Search Report dated Jun. 12, 2018, 7 pages.

* cited by examiner

COMPUTING APPARATUS, NODE DEVICE, AND SERVER

CROSS-REFERENCE TO RELATED APPLICATIONS

This application is a continuation of International Patent Application No. PCT/CN2016/095536 filed on Aug. 16, 2016, which claims priority to Chinese Patent Application No. 201510672294.7 filed on Oct. 15, 2015. The disclosures of the aforementioned applications are hereby incorporated by reference in their entireties.

TECHNICAL FIELD

The present application relates to the computing field, and in particular, to a computing apparatus, a node device, and a server.

BACKGROUND

A server is constituted by a central processing unit (CPU), a memory, and a peripheral. To improve computing performance of the server, the server may be constituted in a scale-up or scale-out manner.

In a large scale-up server, a multi-channel server is constituted using multiple CPUs. Several CPUs are interconnected using a system bus, and share a memory and a peripheral to constitute a node. Nodes are connected using a special-purpose chip such as a node controller, and a CPU in a node may access a memory and a peripheral of another node. The node controller mainly processes cache coherence between the CPUs. Although costs of the multi-channel server are relatively high, a computing speed is very fast. Therefore, the multi-channel server is applicable to a scenario in which a response needs to be made quickly, for example, a real-time system such as an online transaction processing (OLTP) system.

In a scale-out server system, servers that are independent from each other are interconnected using a peripheral network device. For example, the servers are interconnected using an Ethernet card, an INFINIBAND network adapter through a switch. Multiple servers perform collaborative computing such that a cluster server is constituted. Each independent server in the cluster server is referred to as a node. The cluster server has relatively low costs, good scalability, and a relatively high fault-tolerance rate, but a computing speed of the cluster server is lower than that of a multi-channel server. Therefore, the cluster server is applicable to a large-scale distributed computing scenario having a low requirement on a response time.

In order to constitute a multi-channel server using a node controller, two types of apparatuses, that is, a processor and the node controller, need to be researched and developed, leading to extra research and development expenses. A node in a multi-channel server and a node in a cluster server cannot be directly switched to each other. For the node in the multi-channel server, a necessary peripheral such as a network adapter needs to be additionally installed to constitute a cluster server, and for the node in the cluster server, a node controller needs to be additionally installed to constitute a multi-channel server.

SUMMARY

A main technical problem resolved in the present application is to provide a computing apparatus and a node device in order to resolve a problem that servers of different architectures require different special-purpose apparatuses. The present application further provides a server constituted using the node device.

A first aspect of the present application provides a computing apparatus, where the computing apparatus includes at least one general computing core circuit, an internal interface circuit, an external interface circuit, a cache coherence engine circuit, and a protocol conversion circuit, where the cache coherence engine circuit is separately coupled to the general computing core circuit and the internal interface circuit, the internal interface circuit is configured to couple to an internal apparatus using a first communication protocol, where the first communication protocol is a communication protocol used by a system bus, and the internal apparatus is an apparatus sharing a resource with the computing apparatus using the system bus, the external interface circuit is configured to couple to an external apparatus using a second communication protocol, where the second communication protocol is a network communication protocol, and the protocol conversion circuit is configured to perform protocol conversion between a protocol used by the cache coherence engine circuit and the second communication protocol, and the cache coherence engine circuit selectively works in at least a first mode or a second mode, wherein when the cache coherence engine circuit works in the first mode, the cache coherence engine circuit implements cache coherence between the internal apparatus, the external apparatus, and the computing apparatus, and in this case, the cache coherence engine circuit, the protocol conversion circuit, and the external interface circuit are coupled in sequence, and when the cache coherence engine circuit works in the second mode, the cache coherence engine circuit implements cache coherence between the computing apparatus and the internal apparatus, and in this case, the cache coherence engine circuit is coupled to the external interface circuit.

With reference to the first aspect, in a first possible implementation of the first aspect, when the cache coherence engine circuit works in the second mode, the general computing core circuit is configured to implement a computing function together with the internal apparatus, or when the cache coherence engine circuit works in the second mode, the general computing core circuit is configured to at least perform communication control between the internal apparatus and the external apparatus.

With reference to the first possible implementation of the first aspect, in a second possible implementation of the first aspect, the computing apparatus further includes a communication acceleration circuit and a peripheral control circuit, wherein when the cache coherence engine circuit works in the second mode, the communication acceleration circuit is separately coupled to the peripheral control circuit and the external interface circuit, and the peripheral control circuit is coupled to the cache coherence engine circuit.

With reference to the second possible implementation of the first aspect, in a third possible implementation of the first aspect, the communication acceleration circuit is integrated into the external interface circuit.

With reference to any one of the first aspect or the first to the third possible implementations of the first aspect, in a fourth possible implementation of the first aspect, the protocol conversion circuit is integrated into the external interface circuit.

With reference to any one of the first aspect or the first to the third possible implementations of the first aspect, in a fifth possible implementation of the first aspect, the computing apparatus is a system on chip or a processor.

A second aspect of the present application provides a node device, where the node device includes at least a first computing apparatus, a second computing apparatus, and a memory. The second computing apparatus is a processor, and the first computing apparatus includes at least one general computing core circuit, an internal interface circuit, an external interface circuit, a cache coherence engine circuit, and a protocol conversion circuit, where the cache coherence engine circuit is separately coupled to the general computing core circuit and the internal interface circuit, the internal interface circuit is coupled to the second computing apparatus, and the memory is coupled to the general computing core circuit or the second computing apparatus, the internal interface circuit is configured to couple to an internal apparatus using a first communication protocol, where the first communication protocol is a communication protocol used by a system bus, and the internal apparatus is an apparatus sharing a resource with the computing apparatus using the system bus, the external interface circuit is configured to couple to an external apparatus using a second communication protocol, wherein the second communication protocol is a network communication protocol, the protocol conversion circuit is configured to perform protocol conversion between a protocol used by the cache coherence engine circuit and the second communication protocol, and the cache coherence engine circuit selectively works in at least a first mode or a second mode, wherein when the cache coherence engine circuit works in the first mode, the cache coherence engine circuit implements cache coherence between the internal apparatus, the external apparatus, and the first computing apparatus, and in this case, the cache coherence engine circuit, the protocol conversion circuit, and the external interface circuit are coupled in sequence, and when the cache coherence engine circuit works in the second mode, the cache coherence engine circuit implements cache coherence between the first computing apparatus and the internal apparatus, and in this case, the cache coherence engine circuit is coupled to the external interface circuit.

With reference to the second aspect, in a first possible implementation of the second aspect, when the cache coherence engine circuit works in the second mode, the general computing core circuit is configured to implement a computing function together with the internal apparatus, or when the cache coherence engine circuit works in the second mode, the general computing core circuit is configured to at least perform communication control between the internal apparatus and the external apparatus.

With reference to the first possible implementation of the second aspect, in a second possible implementation of the second aspect, the first computing apparatus further includes a communication acceleration circuit and a peripheral control circuit, wherein when the cache coherence engine circuit works in the second mode, the communication acceleration circuit is separately coupled to the peripheral control circuit and the external interface circuit, and the peripheral control circuit is coupled to the cache coherence engine circuit.

With reference to the second possible implementation of the second aspect, in a third possible implementation of the second aspect, the communication acceleration circuit is integrated into the external interface circuit.

With reference to any one of the second aspect or the first to the third possible implementations of the second aspect, in a fourth possible implementation of the second aspect, the protocol conversion circuit is integrated into the external interface circuit.

With reference to any one of the second aspect or the first to the third possible implementations of the second aspect, in a fifth possible implementation of the second aspect, the first computing apparatus is a system on chip or a processor.

A third aspect of the present application provides a server. The server includes at least two node devices, wherein the node device is the node device according to any one of the second aspect or the first to the fifth possible implementations of the second aspect, and an external interface circuit of a first computing apparatus of each node device is coupled to an external interface circuit of a first computing apparatus of another node device.

With reference to the third aspect, in a first possible implementation of the third aspect, the server further includes a switch, and an external interface circuit of a first computing apparatus of at least one node device is coupled to an external interface circuit of a first computing apparatus of at least one another node device using the switch.

Beneficial effects of the present application include the following. When working in the first mode, the cache coherence engine circuit of the computing apparatus implements cache coherence between the computing apparatus, the internal apparatus, and the external apparatus, and in this case, the computing apparatus is used as a node controller such that a resource may be shared between the internal apparatus and the external apparatus. When the cache coherence engine circuit of the computing apparatus works in the second mode, the cache coherence engine circuit processes only cache coherence between the apparatus and the internal apparatus, and the external interface circuit is used as a network interface circuit. By configuring different working modes of the computing apparatus, different types of servers may be constituted using apparatuses of a same type, thereby achieving generality of the apparatus, reducing costs, and implementing flexible switching between different solutions.

DESCRIPTION OF EMBODIMENTS

Figure 1:
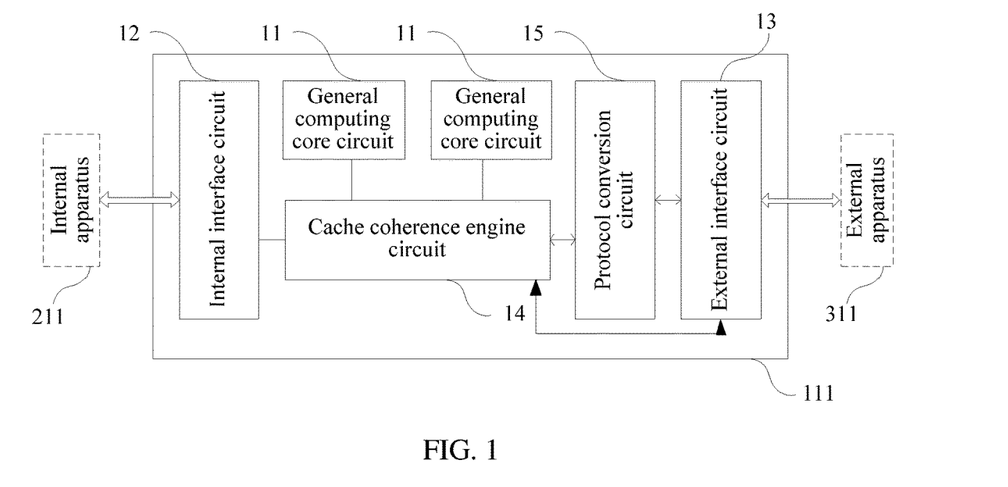
FIG. 1 is a schematic structural diagram of a first embodiment of a computing apparatus according to the present application.

As shown in FIG. 1, a first embodiment of a computing apparatus 111 in the present application includes at least one general computing core circuit 11 (two general computing core circuits are shown in FIG. 1), an internal interface circuit 12, an external interface circuit 13, a cache coherence engine circuit 14, and a protocol conversion circuit 15, where the general computing core circuit 11 is a general processor core, and has functions of executing an instruction, controlling a component, and processing data, the cache coherence engine circuit 14 is separately coupled to all the general computing core circuits 11 and the internal interface circuit 12, and the external interface circuit 13 is configured to couple to another apparatus using a second communication protocol.

The internal interface circuit 12 is configured to couple to an internal apparatus 211 using a first communication protocol. The computing apparatus 111 is connected to the internal apparatus 211 using a system bus, such as a Quick Path Interconnect (QPI) bus, an HYPERTRANSPORT (HT) bus, an Advanced eXtensible Interface (AXI) bus, or another system bus to implement high-speed data transmission. The first communication protocol is a communication protocol used by the system bus. The internal apparatus 211 is an apparatus sharing a resource with the computing apparatus 111 using the system bus. The resource is at least one of a memory, a peripheral, or an input/output (I/O) control component. The internal apparatus 211 may be a general-purpose processor or a special-purpose processor. The external interface circuit 13 is configured to couple to an external apparatus 311 using the second communication protocol. An apparatus that is coupled to the computing apparatus 111 using the external interface circuit 13 is referred to as the external apparatus 311. The computing apparatus 111 is connected to the external apparatus 311 using the Ethernet or INFINIBAND. The second communication protocol is a data transmission protocol used by the Ethernet or INFINIBAND. The protocol conversion circuit 15 is configured to perform protocol conversion between a protocol used by the cache coherence engine circuit 14 and the second communication protocol.

The cache coherence engine circuit 14 selectively works in at least a first mode or a second mode. When working in the first mode, the cache coherence engine circuit 14 implements cache coherence between the internal apparatus 211, the external apparatus 311, and the computing apparatus 111, and in this case, the cache coherence engine circuit 14, the protocol conversion circuit 15, and the external interface circuit 13 are coupled in sequence. When working in the second mode, the cache coherence engine circuit 14 implements cache coherence between the computing apparatus 111 and the internal apparatus 211, and in this case, the cache coherence engine circuit 14 is coupled to the external interface circuit 13. The coupling herein is a signal communication connection.

The cache coherence engine circuit 14 is configured to run a cache coherence protocol to implement data consistency between a cache and a memory. The cache is a storage between the memory and the processor core. A capacity of the cache is relatively small, but a speed of the cache is much higher than a speed of the memory and is close to a speed of the processor core. The processor core accesses the memory using the cache. The memory and the cache are both divided on a block basis, and data migration is performed between the memory and the cache on a block basis. When the processor core accesses a memory address, if a block including the address is in the cache, the processor core directly accesses the cache, if the block including the address is not in the cache, the block is migrated from the memory to the cache. If there is more than one level of cache, the processor core directly accesses the level one cache. Each level of cache may obtain data from a higher level of cache, and the highest level of cache obtains data from the memory. A block in the cache is a duplicate of a corresponding block in the memory. A block in the memory may have multiple duplicates, and if one duplicate changes but the other duplicates do not change, a problem of data consistency is caused. Consequently, an error may occur. For example, in a multi-core processor system, caches of two processor cores both have a duplicate of a same block of a memory, and when one processor core changes data as a result of performing a write operation on the duplicate in the cache of the processor core, but the other processor core does not perform a change, duplicates in the two caches are different.

To resolve the problem, a cache coherence protocol is proposed to ensure data consistency between different caches and a memory. The cache coherence protocol is classified into a snooping-based cache coherence protocol and a directory-based cache coherence protocol. The snooping-based cache coherence protocol means implementing data consistency between a cache and a memory using a bus snooping mechanism. Each core is allowed to snoop into an access of another core to the memory. If a processor core changes data of a duplicate of a block of a cache as a result of performing a write operation, the block is broadcast on a bus. Another processor core receives the broadcast and checks whether a cache has a duplicate of the corresponding block. If the cache has the duplicate of the corresponding block, the duplicate of the corresponding block is marked as invalid. When running the snooping-based cache coherence protocol, the cache coherence engine circuit 14 is mainly responsible for receiving and sending a broadcast. The directory-based cache coherence protocol means establishing a directory to maintain status information of duplicates of blocks in caches. When a duplicate of a block in a cache changes, the directory is searched for a cache having a duplicate of the corresponding block, and a notification is sent to the cache in order to invalidate the duplicate of the corresponding block. When running the directory-based cache coherence protocol, the cache coherence engine circuit 14 is mainly responsible for establishing, managing, and searching a directory, and sending a notification to a related cache.

When working in the first mode, the cache coherence engine circuit 14 is configured to process cache coherence between the internal apparatus 211, the computing apparatus 111, and the external apparatus 311, that is, the cache coherence engine circuit 14 works as a node controller in a multi-channel server such that the internal apparatus 211 and the computing apparatus 111 that share a memory and the external apparatus 311 having a memory may access memories of each other. When running the snooping-based cache coherence protocol, the cache coherence engine circuit 14 is responsible for receiving broadcasts sent by the general computing core circuit 11 of the computing apparatus 111 and a computing core circuit of the internal apparatus 211, and sending the broadcasts to the external apparatus 311, and receiving a broadcast from the external apparatus 311 and sending the broadcast to the general computing core circuit 11 of the computing apparatus 111 and the computing core circuit of the internal apparatus 211. When running the directory-based cache coherence protocol, the cache coherence engine circuit 14 is responsible for managing a complete directory or a part of the directory, and sending a notification to a related cache. In this case, the cache coherence engine circuit 14, the protocol conversion circuit 15, and the external interface circuit 13 are coupled in sequence. The protocol conversion circuit 15 is configured to receive cache coherence protocol content that is sent by the cache coherence engine circuit 14, convert the content into a packet that can be transmitted on the Ethernet or INFINIBAND, and then send the packet to the external interface circuit 13. The protocol conversion circuit 15 is further configured to receive, from the external interface circuit 13, a packet sent by the external apparatus 311, convert the packet into cache coherence protocol content, and then send the content to the cache coherence engine circuit 14.

When working in the second mode, the cache coherence engine circuit 14 is configured to process cache coherence between the computing apparatus 111 and the internal apparatus 211, and in this case, the cache coherence engine circuit 14 is coupled to the external interface circuit 13. The external interface circuit 13 works as a network interface circuit and is responsible for transmitting data between the computing apparatus 111 and the external apparatus 311. The computing apparatus 111 and the external apparatus 311 communicate with each other using a communication protocol such as the transmission control protocol (TCP)/Internet Protocol (IP). The computing apparatus 111 and the internal apparatus 211 share a memory, but the computing apparatus 111 and the internal apparatus 211 that share the memory and the external apparatus 311 cannot access memories of each other. The computing apparatus 111 and the internal apparatus 211 may constitute a node of a cluster server, or may constitute a small single-node multi-channel server.

In addition, when the cache coherence engine circuit 14 works in the second mode, if the external interface circuit 13 does not work, the computing apparatus 111 may work only as a processor. Different working modes of the computing apparatus 111 may be configured in a manner of locally modifying a Basic Input Output System (BIOS) or remotely controlling a Baseboard Management Controller (BMC).

It may be learned from the foregoing embodiment that the computing apparatus has different functions in different working modes, and may be used as a coupling component or a computing component of the multi-channel server or the cluster server. By configuring different working modes of the computing apparatus, different types of servers may be constituted using apparatuses of a same type, thereby achieving generality of the apparatus, reducing costs, and implementing flexible switching between the different types of servers.

Figure 2:
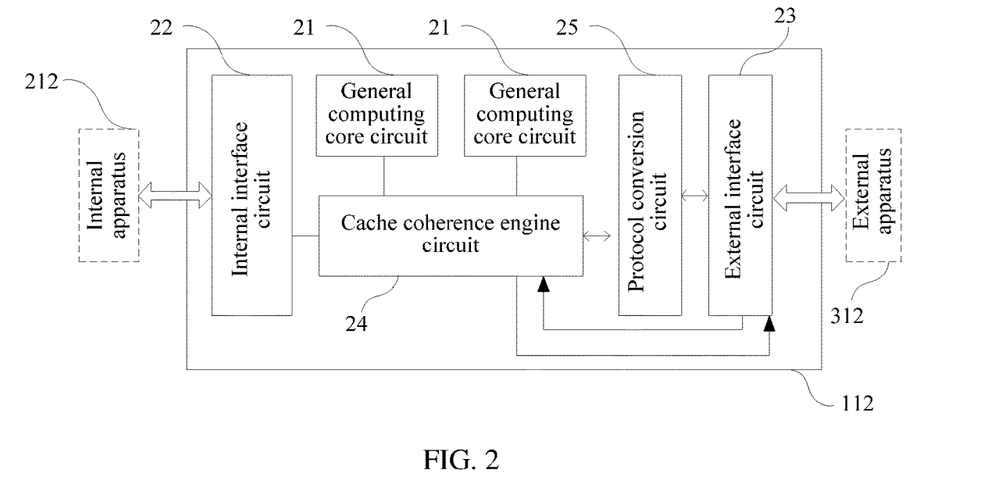
FIG. 2 is a schematic structural diagram of a second embodiment of a computing apparatus according to the present application.

As shown in FIG. 2, based on the first embodiment of the computing apparatus of the present application, in a second embodiment of a computing apparatus of the present application, when a cache coherence engine circuit 24 works in a second mode, a general computing core circuit 21 is configured to implement a computing function together with an internal apparatus 212, that is, the general computing core circuit 21 works as a processor core. In this case, an external interface circuit 23 sends received data to the cache coherence engine circuit 24, and then the cache coherence engine circuit 24 sends the data to a memory (not shown) in a Direct Memory Access (DMA) manner using a bus. The cache coherence engine circuit 24 further obtains data from the memory in the DMA manner and sends the data to the external interface circuit 23 in order to send the data to an external apparatus 312. A computing apparatus 112 works as a processor that integrates a network interface circuit, and the external interface circuit 23 works as the network interface circuit. The computing apparatus 112 further includes internal interface circuit 22 and protocol conversion circuit 25. The computing apparatus 112 and the internal apparatus 212 may constitute a node of a cluster server, or may constitute a small single-node multi-channel server.

Figure 3:
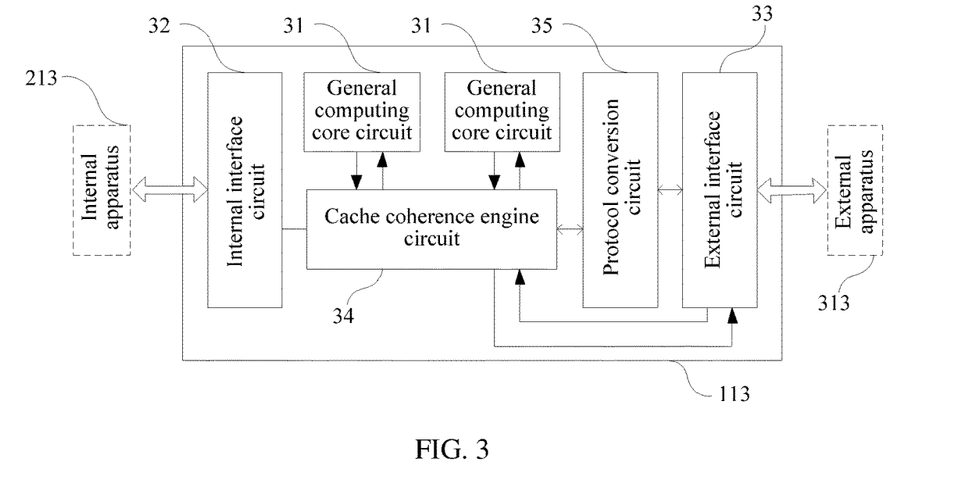
FIG. 3 is a schematic structural diagram of a third embodiment of a computing apparatus according to the present application.

As shown in FIG. 3, based on the first embodiment of the computing apparatus of the present application, in a third embodiment of a computing apparatus 113 of the present application, when a cache coherence engine circuit 34 works in a second mode, at least one general computing core circuit 31 is not configured to perform computation but is configured to perform communication control between an internal apparatus 213 and an external apparatus 313, that is, the at least one general computing core circuit 31 is responsible for transmitting, packaging, decompressing, and delivering data, or further runs a preset instruction to process a communication protocol. Two general computing core circuits 31 shown in FIG. 3 are both configured to perform communication control. Alternatively, one general computing core circuit 31 may be configured to perform communication control, and the other is still configured to perform computation. In this case, an external interface circuit 33 sends received data to the cache coherence engine circuit 34, and then the cache coherence engine circuit 34 sends the data to a memory using the general computing core circuit 31 that is responsible for communication control. The cache coherence engine circuit 34 further obtains data from the memory using the general computing core circuit 31 that is responsible for communication control, and then sends the data to the external interface circuit 33 in order to send data to the external apparatus 313. The computing apparatus 113 works as a communication protocol offload engine, and may constitute a node of a cluster server together with the internal apparatus 213. The computing apparatus 113 further includes internal interface circuit 32 and protocol conversion circuit 35. As the communication protocol offload engine, the computing apparatus 113 is configured to interconnect nodes and transmit data between the nodes. Alternatively, the computing apparatus 113 and the internal apparatus 213 may constitute a small single-node multi-channel server. As the communication protocol offload engine, the computing apparatus 113 is configured to process data transmission between the computing apparatus 113 and a client. Compared with the second embodiment of the computing apparatus of the present application, a data transmission capability of the computing apparatus 113 is enhanced.

Figure 4:
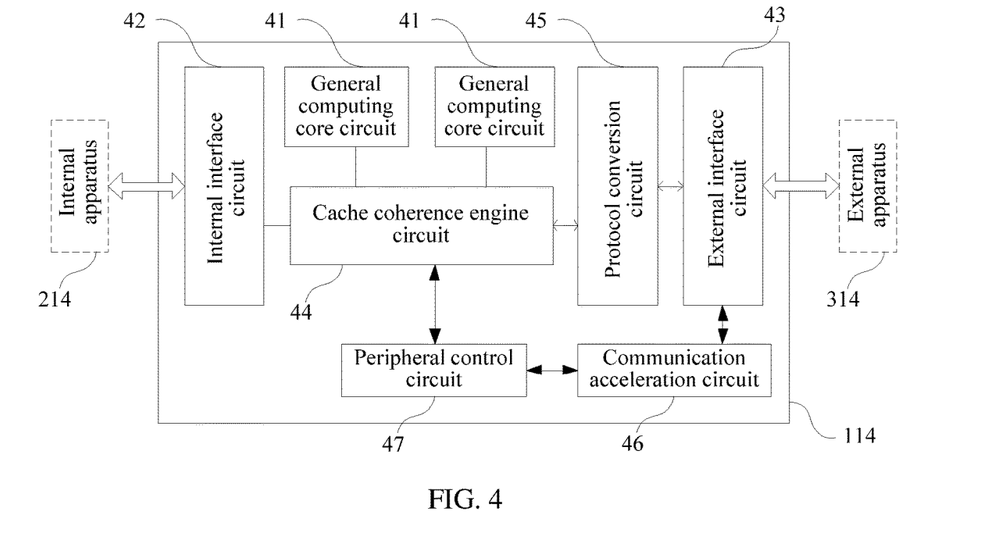
FIG. 4 is a schematic structural diagram of a fourth embodiment of a computing apparatus according to the present application.

As shown in FIG. 4, based on the second embodiment or the third embodiment of the computing apparatus of the present application, in a fourth embodiment of a computing apparatus 114 of the present application, a communication acceleration circuit 46 and a peripheral control circuit 47 are further included. When a cache coherence engine circuit 44 works in a second mode, the communication acceleration circuit 46 is separately coupled to the peripheral control circuit 47 and an external interface circuit 43, and the peripheral control circuit 47 is coupled to the cache coherence engine circuit 44. The communication acceleration circuit 46 is configured to offload a communication protocol, that is, processing for all or some communication protocols is performed in the communication acceleration circuit 46 in order to reduce workload of a general computing core circuit 41 and increase a processing speed. Content of the processing includes an interrupt operation, data dispatching, copying, packet processing, and the like. The communication acceleration circuit 46 may be configured to offload a most frequently used TCP/IP protocol stack, or may be configured to offload a protocol over INFINIBAND, such as the IP over INFINIBAND (IPoIB), the Reliable Datagram Sockets (RDS), or the Session Description Protocol (SDP). The peripheral control circuit 47 is configured to control a peripheral of a system. Generally, the peripheral control circuit 47 controls a peripheral by controlling a bus connected to the peripheral. For example, the peripheral control circuit 47 is a Peripheral Component Interface Express (PCIe) controller, and controls a peripheral connected to a PCIe bus.

The external interface circuit 43 sends, to the communication acceleration circuit 46, a received packet sent by an external apparatus 314. The communication acceleration circuit 46 processes the packet and sends a processed packet to the peripheral control circuit 47. The peripheral control circuit 47 sends the processed packet to the cache coherence engine circuit 44. When the computing apparatus 114 works as the processor that integrates the network interface circuit in the second embodiment of the computing apparatus of the present application, the cache coherence engine circuit 44 sends the processed data to a memory (not shown) in a DMA manner. When the computing apparatus 114 works as the communication protocol offload engine in the third embodiment of the computing apparatus of the present application, the cache coherence engine circuit 44 sends the processed data to the memory using a general computing core circuit 41 that is responsible for communication control. The computing apparatus 114 coupled to an internal apparatus 214 using internal interface circuit 42 and further includes protocol conversion circuit 45. The foregoing process describes a process in which the apparatus 114 receives data from the external apparatus 314, and a process in which the apparatus 114 sends data to the external apparatus 314 may be reversely derived.

Figure 5:
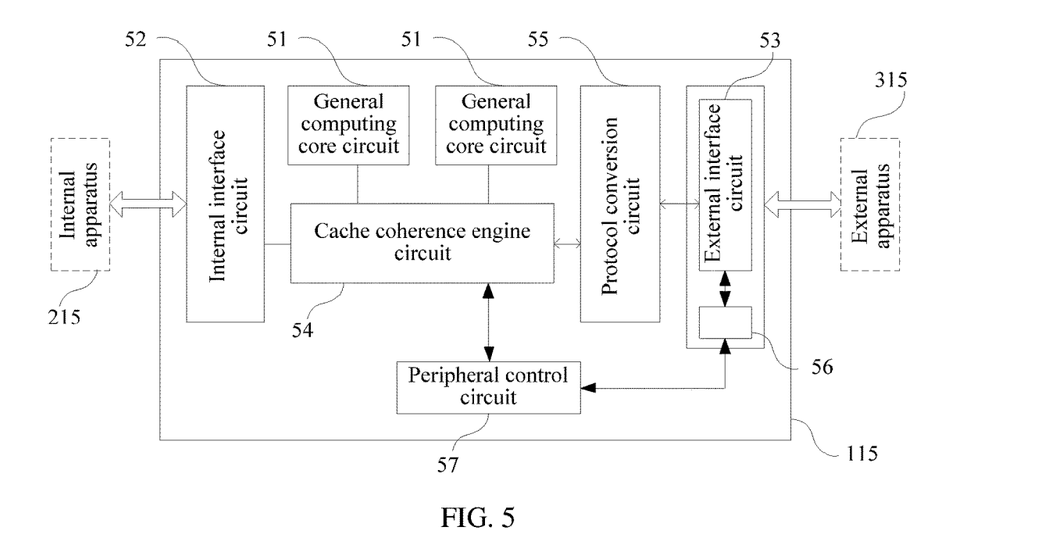
FIG. 5 is a schematic structural diagram of a fifth embodiment of a computing apparatus according to the present application.

As shown in FIG. 5, based on the fourth embodiment of the computing apparatus of the present application, in a fifth embodiment of a computing apparatus 115 of the present application, a communication acceleration circuit 56 and an external interface circuit 53 are integrated together. The external interface circuit 53, the communication acceleration circuit 56, and a peripheral control circuit 57 are coupled in sequence. The external interface circuit 53 and the communication acceleration circuit 56 that are integrated work as a network adapter that integrates a communication protocol offload engine. The network adapter satisfies a bus standard, and may be connected to a bus (such as a PCIe bus) as a peripheral. Additionally, the computing apparatus 115 coupled to an internal apparatus 215 using internal interface circuit 52 and external apparatus 315 using the integrated communication acceleration circuit 56 and the external interface circuit 53 and further includes protocol conversion circuit 55, at least one general computing core circuit 51, cache coherence engine circuit 54.

Figure 6:
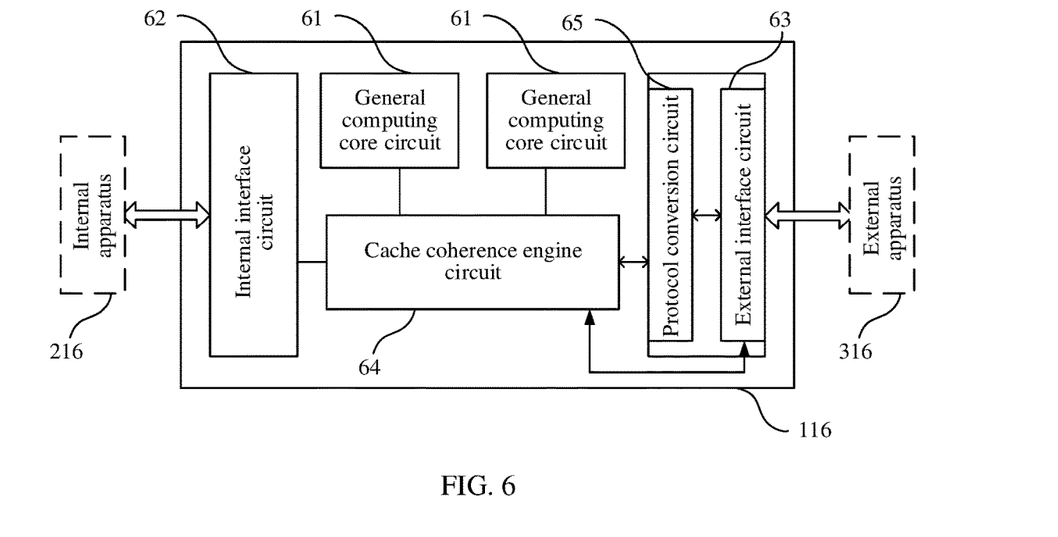
FIG. 6 is a schematic structural diagram of a sixth embodiment of a computing apparatus according to the present application.
Figure 7:
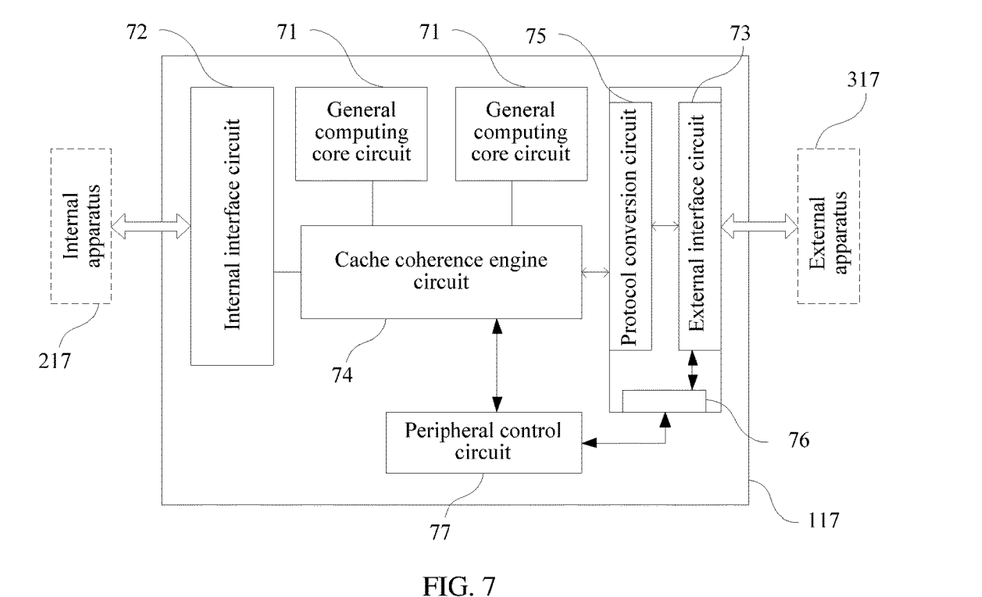
FIG. 7 is a schematic structural diagram of a seventh embodiment of a computing apparatus according to the present application.

As shown in FIG. 6, based on the first embodiment of the computing apparatus of the present application, in a sixth embodiment of a computing apparatus 116 of the present application, a protocol conversion circuit 65 and an external interface circuit 63 are integrated together. When a cache coherence engine circuit 64 works in a first mode, the protocol conversion circuit 65 is responsible for processing data conversion between the cache coherence engine circuit 64 and the external interface circuit 63. When the cache coherence engine circuit 64 works in a second mode, the protocol conversion circuit 65 does not work. Additionally, the computing apparatus 116 coupled to an internal apparatus 216 using internal interface circuit 62 and external apparatus 316 using the integrated protocol conversion circuit 65 and the external interface circuit 63 and further includes, at least one general computing core circuit 61. This embodiment may further be combined with the second, the third, the fourth, and the fifth embodiments of the computing apparatus of the present application. For example, as shown in FIG. 7, based on the fifth embodiment of the computing apparatus of the present application, an external interface circuit 73, a communication acceleration circuit 76, and a protocol conversion circuit 75 are further integrated together, that is, the fifth embodiment and the sixth embodiment of the computing apparatus of the present application are combined as a seventh embodiment of a computing apparatus 117 of the present application. Additionally, the computing apparatus 117 coupled to an internal apparatus 217 using internal interface circuit 72 and external apparatus 317 using the integrated external interface circuit 73, the communication acceleration circuit 76, and the protocol conversion circuit 75 and further includes, at least one general computing core circuit 71, cache coherence engine circuit 74 and peripheral control circuit 77.

Figure 8:
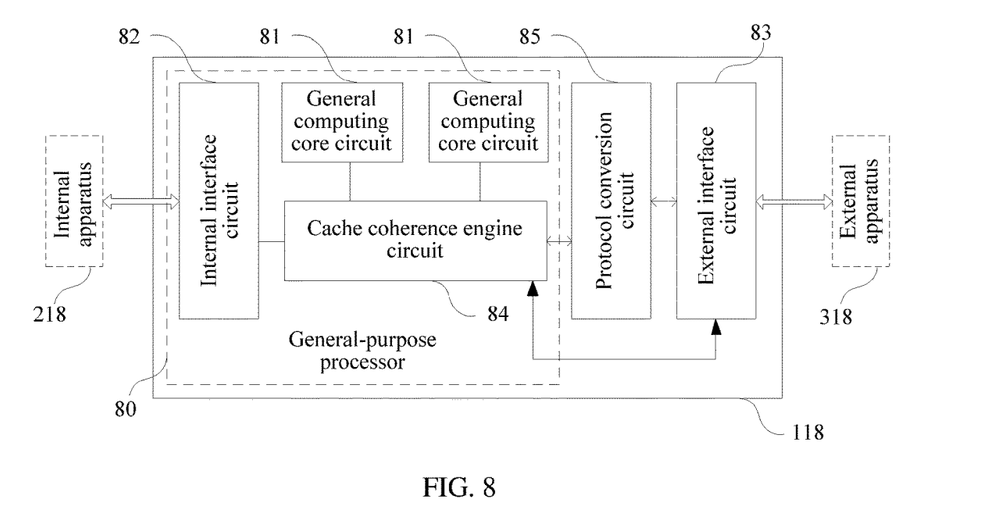
FIG. 8 is a schematic structural diagram of an eighth embodiment of a computing apparatus according to the present application.
Figure 9:
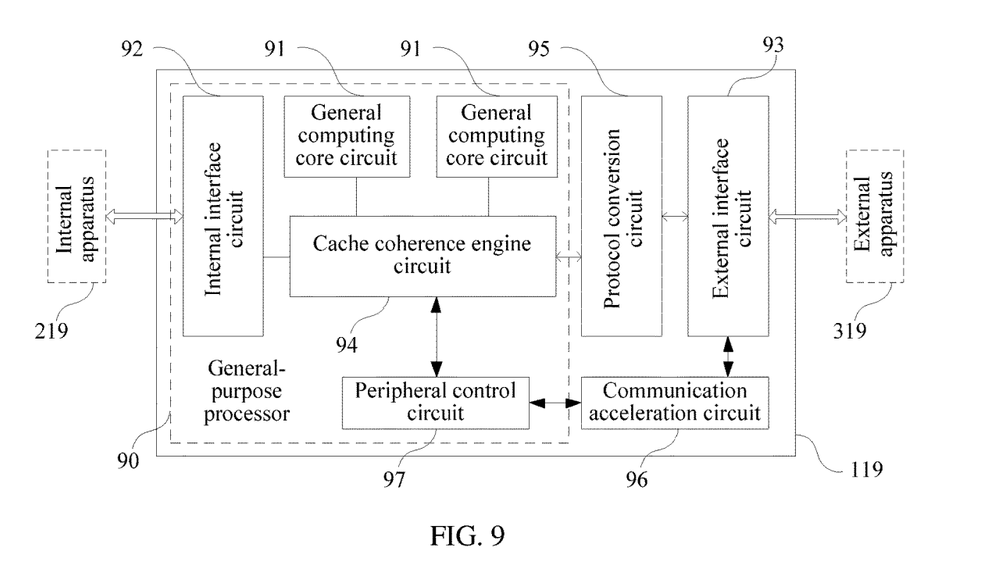
FIG. 9 is a schematic structural diagram of a ninth embodiment of a computing apparatus according to the present application.

In an eighth embodiment of a computing apparatus of the present application, a computing apparatus 118 is a system on chip or a processor. A general-purpose processor 80 includes a general computing core circuit 81, an internal interface circuit 82 coupling internal apparatus 218, and a cache coherence engine circuit 84. The computing apparatus 118 may be a system on chip in which the general-purpose processor 80, a protocol conversion circuit 85, and an external interface circuit 83 coupling external apparatus 318 are encapsulated together, as shown in FIG. 8. Alternatively, the computing apparatus 118 may be a processor that is constituted by integrating all modules into a chip. This embodiment may be combined with any embodiment of the computing apparatus of the present application. When this embodiment is combined with an embodiment including a peripheral control circuit, if the computing apparatus is the system on chip, the peripheral control circuit is generally a part of a general-purpose processor. As shown in FIG. 9, in a ninth embodiment that is of a computing apparatus 119 of the present application and that is obtained by combining the fourth embodiment and the eighth embodiment of the computing apparatus of the present application, a general-purpose processor 90 includes a general computing core circuit 91, an internal interface circuit 92 coupling the internal apparatus 219, a cache coherence engine circuit 94, and a peripheral control circuit 97. The general-purpose processor 90, a protocol conversion circuit 95, an external interface circuit 93 coupling the external apparatus 319, and a communication acceleration circuit 96 are encapsulated together to constitute the computing apparatus 119.

In addition, to improve performance, a memory control circuit may be added to the computing apparatus, and the memory control circuit is coupled to the cache coherence engine circuit such that the computing apparatus may directly access the memory, without using a front side bus. If the computing apparatus is the system on chip, the memory control circuit is a part of the general-purpose processor.

Figure 10:
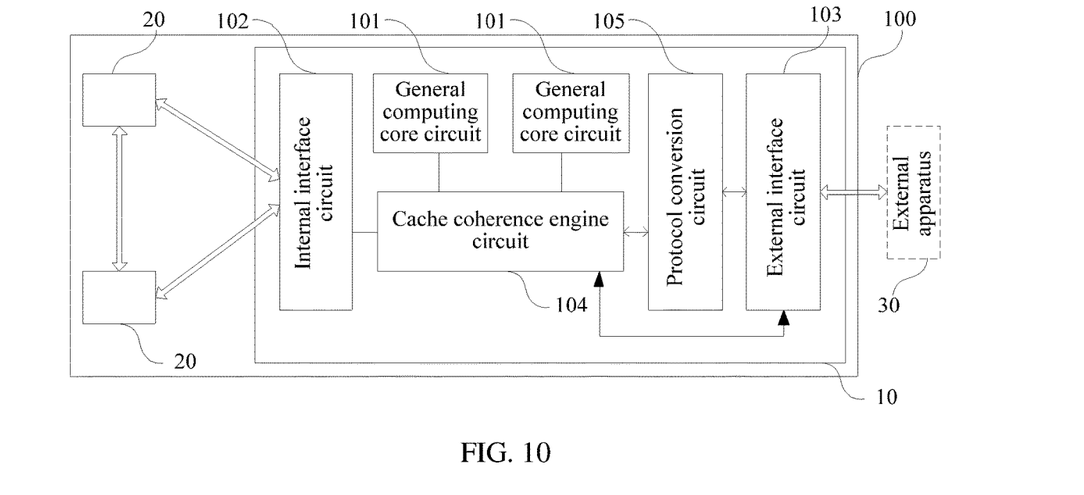
FIG. 10 is a schematic structural diagram of a first embodiment of a node device according to the present application.

As shown in FIG. 10, in a first embodiment of a node device of the present application, a node device 100 includes at least a first computing apparatus 10, a second computing apparatus 20, and a memory (not shown) shared by the first computing apparatus 10 and the second computing apparatus 20, where the node device 100 may further include another shared component such as a DMA control circuit (not shown), a hard disk (not shown), or an I/O control component (not shown).

The first computing apparatus 10 includes at least one general computing core circuit 101 (two general computing core circuits are shown in FIG. 10), an internal interface circuit 102, an external interface circuit 103, a cache coherence engine circuit 104, and a protocol conversion circuit 105. The general computing core circuit 101 is a general processor core having functions of executing an instruction, controlling a component, and processing data. The cache coherence engine circuit 104 is separately coupled to each general computing core circuit 101 and the internal interface circuit 102. The internal interface circuit 102 is configured to couple to each second computing apparatus 20 using a first communication protocol. The external interface circuit 103 is configured to couple to an external apparatus 30 using a second communication protocol. The protocol conversion circuit 105 is configured to perform protocol conversion between a protocol used by the cache coherence engine circuit 104 and the second communication protocol.

The second computing apparatus 20 that is coupled to the first computing apparatus 10 using the internal interface circuit 102 is also referred to as an internal apparatus. The first computing apparatus 10 is connected to the second computing apparatus 20 using a system bus, such as a QPI bus, an HT bus, an AXI bus, or another system bus to implement high-speed data transmission. The first communication protocol is a data transmission protocol used by the system bus. The second computing apparatus 20 shares a resource with the first computing apparatus 10 using the system bus. The resource is at least one of a memory, a peripheral, or an I/O control component. An apparatus that is coupled to the first computing apparatus 10 using the external interface circuit 103 is referred to as the external apparatus 30. The first computing apparatus 10 is connected to the external apparatus 30 using the Ethernet or INFINIBAND. The second communication protocol is a data transmission protocol used by the Ethernet or INFINIBAND.

The cache coherence engine circuit 104 selectively works in at least a first mode or a second mode. When working in the first mode, the cache coherence engine circuit 104 implements cache coherence between the internal apparatus (that is, the second computing apparatus 20), the external apparatus 30, and the first computing apparatus 10, and in this case, the cache coherence engine circuit 104, the protocol conversion circuit 105, and the external interface circuit 103 are coupled in sequence. When working in the second mode, the cache coherence engine circuit 104 implements cache coherence between the first computing apparatus 10 and the internal apparatus (that is, the second computing apparatus 20), and in this case, the cache coherence engine circuit 104 is coupled to the external interface circuit 103. The coupling herein is a signal communication connection.

For functions of a cache coherence protocol and the cache coherence engine circuit 104, refer to related descriptions in the first embodiment of the computing apparatus of the present application. When working in the first mode, the cache coherence engine circuit 104 is configured to process cache coherence between the first computing apparatus 10, the second computing apparatus 20, and the external apparatus 30, that is, process cache coherence between the node device 100 and another node device such that the first computing apparatus 10, the second computing apparatus 20, and the external apparatus 30 may access memories of each other. In this case, the cache coherence engine circuit 104, the protocol conversion circuit 105, and the external interface circuit 103 are coupled in sequence. The protocol conversion circuit 105 is configured to receive cache coherence protocol content sent by the cache coherence engine circuit 104, convert the content into a packet that can be transmitted on the Ethernet or INFINIBAND, and then send the packet to the external interface circuit 103. The protocol conversion circuit 105 is further configured to receive, from the external interface circuit 103, a packet sent by the external apparatus 30, convert the packet into cache coherence protocol content, and then send the content to the cache coherence engine circuit 104. In this case, as a node in a multi-channel server, the node device 100 constitutes the multi-channel server together with another node. The nodes may access memories and other components of each other. The first computing apparatus 10 works as a node controller. The external apparatus 30 is a node controller of the other node device.

When working in the second mode, the cache coherence engine circuit 104 is configured to process cache coherence between the first computing apparatus 10 and the second computing apparatus 20, that is, process only cache coherence inside the node device 100. The cache coherence engine circuit 104 is coupled to the external interface circuit 103. The external interface circuit 103 is responsible for transmitting data between the first computing apparatus 10 and the external apparatus 30. The first computing apparatus 10 communicates with the external apparatus 30 using a communication protocol such as the TCP/IP. If the external apparatus 30 is a component in another node device and responsible for data transmission, as a node of a cluster server, the node device 100 constitutes the cluster server together with another node. The nodes may transmit data to each other and implement distributed computing work together, but cannot access memories and other components of each other. The external interface circuit 103 works as a network interface circuit of the node in the cluster server. If the external apparatus 30 is another network node, for example, a client, the node device 100 provides a service as a small single-node multi-channel server, and the external interface circuit 103 works as a network interface circuit in the server.

The second computing apparatus 20 may be a general-purpose processor, or may be a special-purpose processor. The system bus used by the second computing apparatus 20 matches a system bus used by the internal interface circuit 102 of the first computing apparatus 10. The second computing apparatus 20 may also be the first computing apparatus 10. When the first computing apparatus 10 works as the second computing apparatus 20, the cache coherence engine circuit 104 works in the second mode, and the external interface circuit 103 does not work.

FIG. 10 shows only two second computing apparatuses 20. The two second computing apparatuses 20 and the first computing apparatus 10 are coupled to each other, and constitute the node device 100. Actually, provided that a quantity of second computing apparatuses 20 does not exceed a quantity of internal interfaces (for example, interfaces of the internal interface circuit 102 of the first computing apparatus 10) configured for coupling, there may be more or fewer second computing apparatuses 20.

The first computing apparatus 10 and the second computing apparatus 20 share the memory. The memory may be coupled to a front side bus using a memory controller. The front side bus is separately coupled to the first computing apparatus 10 and the second computing apparatus 20. When being coupled to the first computing apparatus 10, the front side bus is coupled to the general computing core circuit 101 using the cache coherence engine circuit 104. Alternatively, a memory controller may be integrated into the first computing apparatus 10 and/or the second computing apparatus 20, and the memory is coupled to the memory controller. If a memory capacity is relatively large and at least two memory modules need to be used, different memory modules may be respectively coupled to memory controllers of different computing apparatuses, or all memory modules are coupled to a memory controller of a same computing apparatus.

Different working modes of the first computing apparatus 10 may be configured in a manner of locally modifying a BIOS or remotely controlling a BMC.

It may be learned from the foregoing embodiment that because the first computing apparatus 10 in the node device 100 has different functions in different working modes, the node device 100 may be used as a small multi-channel server, a node of the multi-channel server, or a node of the cluster server. By configuring different working modes of the first computing apparatus 10, different types of servers may be constituted using node devices of a same type, thereby implementing achieving of the device, reducing costs, and implementing flexible switching between different solutions.

In a subsequent embodiment of a node device of the present application, a first computing apparatus of the node device is the computing apparatus in the second to the ninth embodiments or a possible combination of the second to the ninth embodiments of the computing apparatus of the present application.

Figure 11:
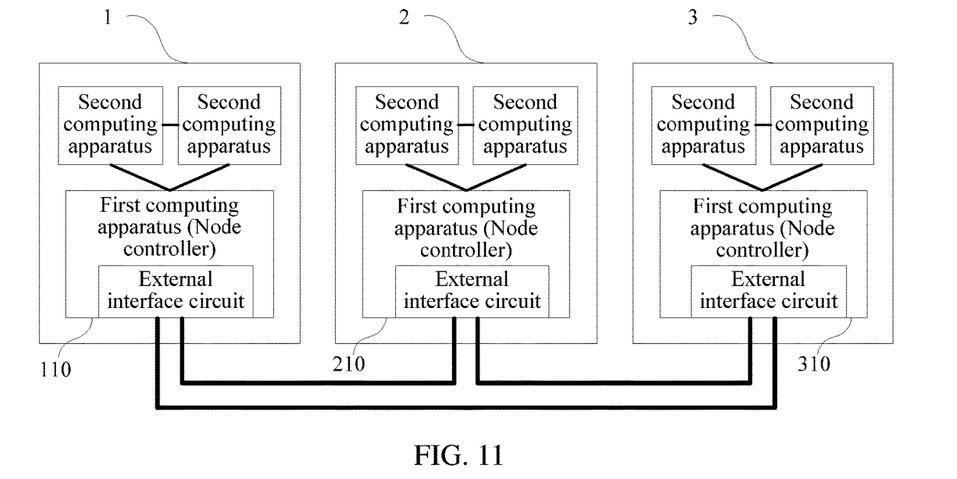
FIG. 11 is a schematic structural diagram of a first embodiment of a server according to the present application.

As shown in FIG. 11, a first embodiment of a server of the present application includes at least two node devices. Three node devices 1, 2, and 3 are shown in FIG. 11. Each node device may be a node device in any embodiment of the node device of the present application. The node devices may be the same or may be different. Quantities of second computing apparatuses used by all the node devices may be the same (in FIG. 11, each node device uses two second computing apparatuses), or may be different. An external interface circuit of a first computing apparatus of each node device is separately coupled to an external interface circuit of a first computing apparatus of another node device using the Ethernet or INFINIBAND to implement interconnection between the three node devices 1, 2, and 3. The node devices 2 and 3 are external devices relative to the node device 1. Similarly, a status of the other node device may be obtained.

Working modes of first computing apparatuses 110, 210, and 310 of the three node devices 1, 2, and 3 are configured so that the first computing apparatuses 110, 210, and 310 work as node controllers. That is, a cache coherence engine circuit (not shown) of each first computing apparatus works in a first mode, and the cache coherence engine circuit processes cache coherence between different node devices such that the different node devices may access memories and other components of each other. The three node devices 1, 2, and 3 constitute a six-channel server together. A quantity of channels of the server may be changed according to an actual requirement by adjusting a quantity of second computing apparatuses in each node device and/or a quantity of node devices.

In a conventional multi-channel server, different node devices are usually interconnected using a high-speed bus. Limited by performance of the high-speed bus, a physical distance between the node devices cannot be excessively large. Generally, all node devices are integrated into a cabinet. As a quantity of node devices increases, a hardware system has higher design requirements on heat dissipation, cabling, and the like. This is not beneficial to expansion of the multi-channel server. An extendable distance of the Ethernet or INFINIBAND used in this embodiment is much longer than that of the high-speed bus such that the node devices may be independently disposed, thereby facilitating expansion of the server.

Figure 12:
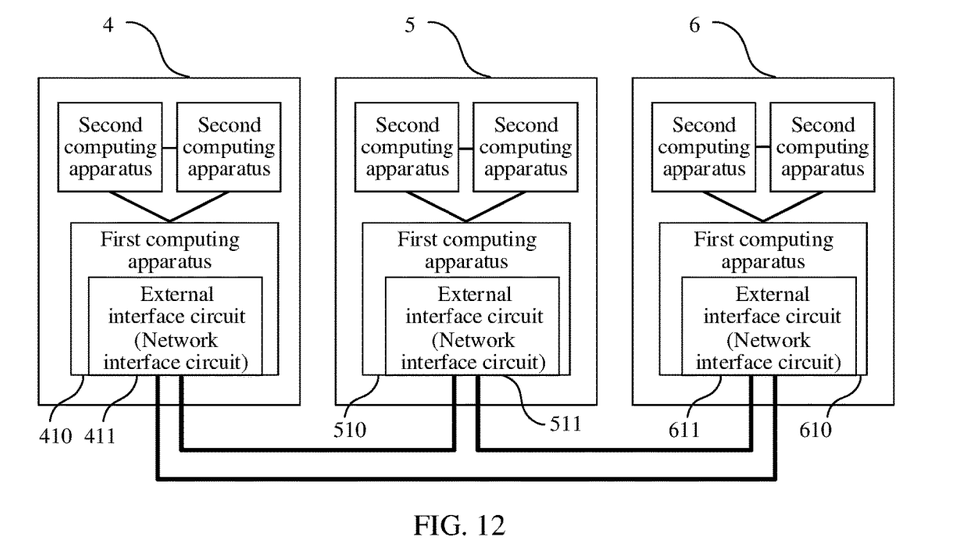
FIG. 12 is a schematic structural diagram of a second embodiment of a server according to the present application.

As shown in FIG. 12, a second embodiment of a server of the present application includes at least two node devices. Three node devices 4, 5, and 6 are shown in FIG. 12. Each node device may be a node device in any embodiment of the node device of the present application. The node devices may be the same or may be different. Quantities of second computing apparatuses used by all the node devices may be the same (in FIG. 12, each node device uses two second computing apparatuses), or may be different. An external interface circuit (e.g. 411, 511 and 611) of a first computing apparatus (e.g. 410, 510 and 610) of each node device is coupled to an external interface circuit of a first computing apparatus of another node device using the Ethernet or INFINIBAND to implement interconnection between the node devices. The node devices 5 and 6 are external devices relative to the node device 4. Similarly, a status of the other node device may be obtained.

Working modes of first computing apparatuses 410, 510, and 610 of the three node devices 4, 5, and 6 are configured so that cache coherence engine circuits (not shown) of the first computing apparatuses 410, 510, and 610 work in a second mode, and the cache coherence engine circuits process cache coherence in respective node devices. Different node devices cannot access memories and other components of each other. The three node devices 4, 5, and 6 constitute a cluster server. External interface circuits 411, 511, and 611 of the first computing apparatuses 410, 510, and 610 work as network interface circuits.

For a first computing apparatus of a single node device, if all general computing core circuits (not shown) of the first computing apparatus are configured to perform computation, the first computing apparatus works as a processor that integrates a network interface circuit, if at least one general computing core circuit of the first computing apparatus is configured to perform communication control, the first computing apparatus works as a communication protocol offload engine. In both of the two working modes, an external interface circuit works as a network interface circuit. For a detailed description, refer to the second embodiment and the third embodiment of the computing apparatus of the present application. By comparison, the first computing apparatus has a higher data transmission capability in a communication offloading mode.

The working mode of the first computing apparatus of each node device in the cluster server may be selected according to a requirement on a data transmission capability. For example, for a node device having relatively heavy communication workload (for example, the node device is further responsible for communication with a client), a working mode of a first computing apparatus of the node device may be configured as communication offloading, a first computing apparatus of another node device having relatively light workload may work as a processor that integrates a network interface circuit. Certainly, working modes of first computing apparatuses of all node devices may be configured as communication offloading, or all the first computing apparatuses may be configured as processors that integrate a network interface circuit.

It may be learned from the foregoing two embodiments of the server that the multi-channel server or the cluster server may be constituted using node devices having good generality. Different working modes of first computing apparatuses of all node devices result in different content transmitted on the Ethernet or INFINIBAND. In the multi-channel server, nodes may access memories of each other, in the cluster server, nodes cannot access memories of each other. By configuring different working modes of the first computing apparatuses of the node devices, different node devices may be switched between a state in which the different node devices can access memories of each other and a state in which the different node devices cannot access the memories of each other, thereby implementing switching between solutions of the multi-channel server and the cluster server, and reducing costs.

Figure 13:
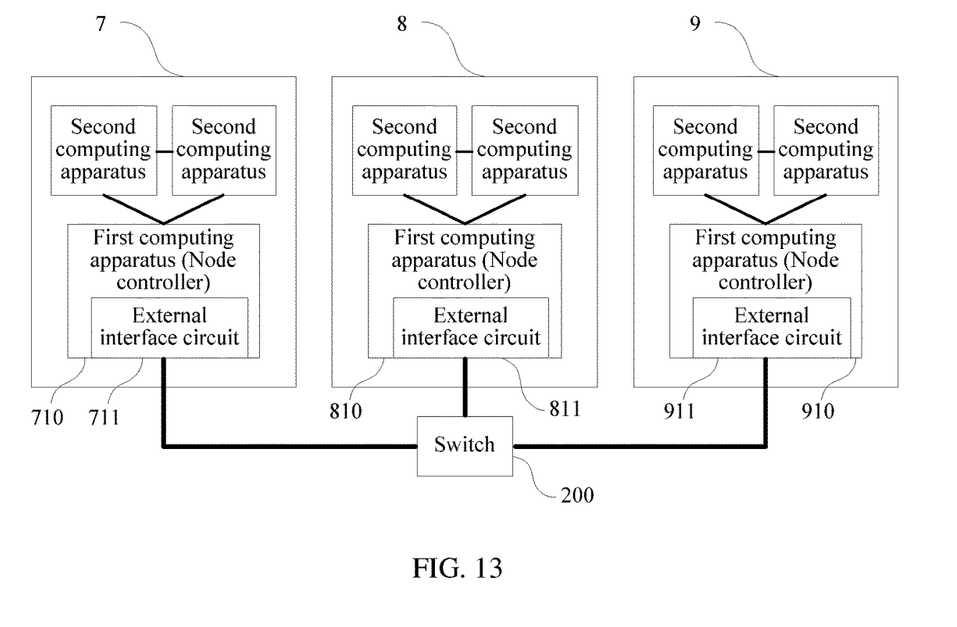
FIG. 13 is a schematic structural diagram of a third embodiment of a server according to the present application.

As shown in FIG. 13, based on the first embodiment or the second embodiment of the server of the present application, in a third embodiment of a server of the present application, a switch 200 is further included. The switch 200 is coupled to external interface circuits 711, 811, and 911 of first computing apparatuses 710, 810, and 910 of node devices 7, 8, and 9 using the Ethernet or INFINIBAND. The external interface circuits 711, 811, and 911 are not directly coupled but implement data transmission using the switch 200. The switch 200 is configured to establish a signal channel between the external interface circuits 711, 811, and 911 according to a requirement to transmit data.

FIG. 13 is based on the first embodiment of the server of the present application, or may be based on the second embodiment of the server of the present application. The switch 200 in FIG. 13 is coupled to all the external interface circuits 711, 811, and 911. Alternatively, two of the external interface circuits 711, 811, and 911 are directly coupled, and are coupled to the other external interface circuit using the switch 200. For example, the external interface circuits 711 and 811 are directly coupled, and the external interface circuit 711 or 811 is coupled to the external interface circuit 911 using the switch 200. Similarly, possible coupling statuses of the switch 200 included in a server constituted by more node devices may be obtained.

In FIG. 11 and FIG. 12, the node devices constitute the server in an ad hoc manner, that is, the node devices are directly mutually coupled using the Ethernet or INFINIBAND. If the server is expanded in a manner of adding a new node device, the newly added node device needs to be directly coupled to all the existing node devices. In the first embodiment and the second embodiment of the server of the present application, different node devices are interconnected using external interface circuits of first computing apparatuses of the node devices. Because a quantity of interfaces of an external interface circuit is limited, a scale of a server constituted in the ad hoc manner is limited. In this embodiment, the switch is added to the server, and some or all node devices are coupled using the switch such that the limitation by the quantity of interfaces is broken for constituting a larger-scale server.

The foregoing descriptions are merely implementations of the present application, and are not intended to limit the scope of the present application. An equivalent structural or equivalent process alternation made using the content of the specification and drawings of the present application, or a direct or an indirect application of the content of the specification and drawings in another related technical field, shall fall within the protection scope of the present application.

What is claimed is:

1. A computing apparatus, comprising:
   an internal interface circuit configured to couple to an internal apparatus using a first communication protocol, the first communication protocol comprising a communication protocol used by a system bus, and the internal apparatus comprising an apparatus sharing a resource with the computing apparatus using the system bus;
   an external interface circuit configured to couple to an external apparatus using a second communication protocol, the second communication protocol comprising a network communication protocol; and
   a cache coherence engine circuit separately coupled to the internal interface circuit and each general computing core circuit in at least one general computing core circuit and configured to selectively work in at least a first mode or a second mode, when the cache coherence engine circuit is set to be working in the first mode, the cache coherence engine circuit being further coupled to a protocol conversion circuit and the external interface circuit in sequence and configured to implement cache coherence among the internal apparatus, the external apparatus, and the computing apparatus, and the protocol conversion circuit being configured to perform protocol conversion between a protocol used by the cache coherence engine circuit and the second communication protocol, and when the cache coherence engine circuit is set to be working in the second mode, the cache coherence engine circuit being directly coupled to the external interface circuit and further configured to implement cache coherence between the computing apparatus and the internal apparatus.

2. The computing apparatus of claim 1, wherein when the cache coherence engine circuit works in the second mode, the at least one general computing core circuit is configured to:
   implement a computing function together with the internal apparatus; or
   perform communication control between the internal apparatus and the external apparatus.

3. The computing apparatus of claim 2, further comprising a communication acceleration circuit and a peripheral control circuit, and when the cache coherence engine circuit works in the second mode, the communication acceleration circuit is separately coupled to the peripheral control circuit and the external interface circuit, and the peripheral control circuit is coupled to the cache coherence engine circuit.

4. The computing apparatus of claim 3, wherein the communication acceleration circuit is integrated into the external interface circuit.

5. The computing apparatus of claim 1, wherein the protocol conversion circuit is integrated into the external interface circuit.

6. The computing apparatus of claim 1, further comprising a system on chip or a processor.

7. A node device, comprising:
a processor; and
at least one first computing apparatus, and each first computing apparatus comprising:
an internal interface circuit configured to couple to the processor using a first communication protocol comprising a communication protocol used by a system bus, and the processor sharing a resource with the at least one first computing apparatus using the system bus;
an external interface circuit configured to couple to an external apparatus using a second communication protocol comprising a network communication protocol; and
a cache coherence engine circuit separately coupled to the internal interface circuit and each general computing core circuit in at least one general computing core circuit and configured to selectively work in at least a first mode or a second mode, when the cache coherence engine circuit is set to be working in the first mode, the cache coherence engine circuit being further coupled to a protocol conversion circuit and the external interface circuit in sequence and configured to implement cache coherence among the processor, the external apparatus, and the at least one first computing apparatus, and the protocol conversion circuit being configured to perform protocol conversion between a protocol used by the cache coherence engine circuit and the second communication protocol, and when the cache coherence engine circuit is set to be working in the second mode, the cache coherence engine circuit being directly coupled to the external interface circuit and further configured to implement cache coherence between the at least one first computing apparatus and the processor.

8. The node device according to claim 7, wherein when the cache coherence engine circuit works in the second mode, the at least one general computing core circuit is configured to:
implement a computing function together with the processor; or
perform communication control between the processor and the external apparatus.

9. The node device of claim 8, wherein the at least one first computing apparatus further comprises a communication acceleration circuit and a peripheral control circuit, when the cache coherence engine circuit works in the second mode, the communication acceleration circuit being separately coupled to the peripheral control circuit and the external interface circuit and the peripheral control circuit being coupled to the cache coherence engine circuit.

10. The node device of claim 9, wherein the communication acceleration circuit is integrated into the external interface circuit.

11. The node device of claim 7, wherein the protocol conversion circuit is integrated into the external interface circuit.

12. The node device of claim 7, wherein the at least one first computing apparatus comprises a system on chip or another processor.

13. A server, comprising at least two node devices, and each node device comprising:
a processor; and
at least one first computing apparatus, and each first computing apparatus comprising:
an internal interface circuit configured to couple to the processor using a first communication protocol comprising a communication protocol used by a system bus, and the processor sharing a resource with the at least one first computing apparatus by using the system bus;
an external interface circuit configured to couple to an external apparatus using a second communication protocol comprising a network communication protocol; and
a cache coherence engine circuit separately coupled to the internal interface circuit and each general computing core circuit in at least one general computing core circuit and configured to selectively work in at least a first mode or a second mode, when the cache coherence engine circuit is set to be working in the first mode, the cache coherence engine circuit being further coupled to protocol conversion circuit and the external interface circuit in sequence and configured to implement cache coherence among the processor, the external apparatus, and the at least one first computing apparatus, and the protocol conversion circuit being configured to perform protocol conversion between a protocol used by the cache coherence engine circuit and the second communication protocol, when the cache coherence engine circuit is set to be working in the second mode, the cache coherence engine circuit being directly coupled to the external interface circuit and further configured to implement cache coherence between the at least one first computing apparatus and the processor, and an external interface circuit of at least one first computing apparatus of each node device being coupled to an external interface circuit of at least one first computing apparatus of another node device.

14. The server of claim 13, further comprising a switch, and an external interface circuit of at least one first computing apparatus of at least one node device being coupled to an external interface circuit of at least one first computing apparatus of at least one another node device using the switch.

15. The server of claim 13, wherein when the cache coherence engine circuit works in the second mode, the at least one general computing core circuit is configured to:
implement a computing function together with the processor; or
perform communication control between the processor and the external apparatus.

16. The server of claim 15, wherein the at least one first computing apparatus further comprises a communication acceleration circuit and a peripheral control circuit, when the cache coherence engine circuit works in the second mode, the communication acceleration circuit being separately coupled to the peripheral control circuit and the external interface circuit, and the peripheral control circuit being coupled to the cache coherence engine circuit.

17. The server of claim 16, wherein the communication acceleration circuit is integrated into the external interface circuit.

18. The server of claim 13, wherein the protocol conversion circuit is integrated into the external interface circuit.

19. The server of claim 13, wherein the at least one first computing apparatus further comprises a system on chip.

20. The server of claim 13, wherein the at least one first computing apparatus further comprises another processor.

* * * * *

UNITED STATES PATENT AND TRADEMARK OFFICE
CERTIFICATE OF CORRECTION

PATENT NO. : 10,366,006 B2
APPLICATION NO. : 15/954002
DATED : July 30, 2019
INVENTOR(S) : Jianrong Xu et al.

Page 1 of 1

It is certified that error appears in the above-identified patent and that said Letters Patent is hereby corrected as shown below:

Claim 13, Column 18, Line 5: "by" needs to be removed from "apparatus by using"

Signed and Sealed this
Tenth Day of September, 2019

Andrei Iancu
*Director of the United States Patent and Trademark Office*